(12) United States Patent
Hwang et al.

(10) Patent No.: US 12,040,674 B2
(45) Date of Patent: Jul. 16, 2024

(54) BUSBAR UNIT FOR MOTOR (71) Applicant: HYUNDAI MOBIS CO., LTD., Seoul (KR)

(72) Inventors: Seong Jun Hwang, Yongin-si (KR); Yeong Woo Seo, Yongin-si (KR); Hye Seong Yang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 364 days.

(21) Appl. No.: 17/375,357

(22) Filed: Jul. 14, 2021

(65) Prior Publication Data
US 2022/0029496 A1 Jan. 27, 2022

(30) Foreign Application Priority Data
Jul. 21, 2020 (KR) .................. 10-2020-0090269

(51) Int. Cl.
*H02K 3/50* (2006.01)
*H02K 3/52* (2006.01)
*H02K 5/22* (2006.01)

(52) U.S. Cl.
CPC ............. *H02K 3/522* (2013.01); *H02K 5/225* (2013.01); *H02K 2203/09* (2013.01)

(58) Field of Classification Search
CPC .................................................. H02K 2203/09
See application file for complete search history.

(56) References Cited

FOREIGN PATENT DOCUMENTS

CN 103532312 B * 12/2017 ............. H02K 3/522
WO WO2021-182635 A1 * 9/2021 ............. B23K 26/21

* cited by examiner

*Primary Examiner* — Ramon M Barrera
(74) *Attorney, Agent, or Firm* — NSIP Law (57) ABSTRACT

A busbar assembly, which is electrically connected to a motor comprising a stator around which coils are wound, includes: a terminal part including terminal members each including terminal grooves configured to accommodate the coils such that the coils are electrically connected to the terminal grooves; and a holder configured to support the terminal part.

10 Claims, 9 Drawing Sheets

BUSBAR UNIT FOR MOTOR

CROSS-REFERENCE TO RELATED APPLICATIONS

This application claims the benefit under 35 U.S.C. § 119(a) of Korean Patent Application No. 10-2020-0090269 filed on Jul. 21, 2020 in the Korean Intellectual Property Office, the entire disclosure of which is incorporated herein by reference for all purposes.

TECHNICAL FIELD

The present disclosure relates to a busbar unit for a motor, and more particularly, to a busbar unit for a motor that has improved durability, stability, and reliability.

BACKGROUND ART

A hybrid vehicle or an electric vehicle, which is called an environmentally-friendly vehicle, generates driving power using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes stator cores formed by stacking electrical steel sheets, and stator coils wound around the stator cores.

A busbar is provided at an upper side of the stator, and the stator coils are connected to an external power source through the busbar.

The busbar may be structured to include a plurality of terminals inside a ring-shaped holder, and the terminals may be constituted as a combination of phase terminals connected to U-phase, V-phase, and W-phase power sources, and a neutral terminal that connects the phase terminals.

Meanwhile, the stator coils are fused with terminal portions of the terminals by being welded to the terminal portions of the terminals (e.g., welded by applying electric current) in a state in which the stator coils are compressed. After the terminal portions of the terminals are fused with the stator coils, an insulating material (e.g., epoxy) for insulation between the terminals is applied to cover the terminal portions of the terminals.

In the related art, however, both a compressing force and heat are applied to the stator coil during a process of fusing the stator coil with the terminal portion of the terminal, which causes a deterioration in strength and durability of the stator coil.

In addition, when the motor vibrates or external impact is applied to the motor, the fused portion of the stator coil, which has low strength, is easily damaged or separated from the terminal portion of the terminal.

Further, in the related art, the terminal portion of the terminal is disposed at an upper side of the stator coil, and the stator coil is fused with the terminal portion at the upper side of the stator coil. Therefore, a space (height) for disposing the terminal portion of the terminal needs to be ensured at the upper side of the stator coil even though a thickness of the busbar is reduced maximally. For this reason, it is difficult to reduce an overall height of the motor.

Therefore, recently, various studies are conducted to improve durability, stability, and reliability of the coil, but the study results are still insufficient. Accordingly, there is a need to develop a technology for improving durability, stability, and reliability of the coil.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a busbar assembly, which is electrically connected to a motor comprising a stator around which coils are wound, includes: a terminal part including terminal members each including terminal grooves configured to accommodate the coils such that the coils are electrically connected to the terminal grooves; and a holder configured to support the terminal part.

The terminal grooves may be exposed from upper portions of the terminal members.

The terminal members may include: a first terminal member including first terminal grooves, among the terminal grooves, configured to accommodate the coils such that the coils are electrically connected to the first terminal grooves; and a second terminal member stacked on an upper portion of the first terminal member and including second terminal grooves, among the terminal grooves, configured to accommodate the coils such that the coils are electrically connected to the second terminal grooves.

The first terminal member may include: a first horizontal terminal body including the first terminal grooves; and a first vertical terminal body connected to an end of the first horizontal terminal body. The second terminal member may include: a second horizontal terminal body including the second terminal grooves and stacked on an upper portion of the first horizontal terminal body such that the first terminal grooves are exposed; and a second vertical terminal body connected to an end of the second horizontal terminal body.

The busbar assembly may further include a spacer interposed between the first terminal member and the second terminal member.

The spacer may be interposed between the first horizontal terminal body and the second horizontal terminal body.

The second horizontal terminal body may have a form of a continuous ring, and the spacer may have an inner circumferential surface corresponding to an inner diameter of the second horizontal terminal body.

The holder may include: a first accommodation portion configured to accommodate the first vertical terminal body; and a second accommodation portion configured to accommodate the second vertical terminal body.

A fastening hole may be disposed in either one of the first terminal member and the second terminal member, and a fastening portion configured to be fastened to the fastening hole may be disposed on the spacer.

The fastening portion may include a snap-fit coupling portion configured to be fastened to the fastening hole in a snap-fit manner.

The coils may be seated in the terminal grooves and fixed in the terminal grooves by welds.

The welds may be laser welds.

The busbar welds may be welds formed by a green laser beam.

Other features and aspects will be apparent from the following detailed description, the drawings, and the claims.

DETAILED DESCRIPTION

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 9, a busbar unit (or, busbar assembly) 10 for a motor according to an embodiment of the present disclosure is electrically connected to a motor including a stator 20 around which coils 60 are wound. The busbar unit 10 for a motor includes a terminal part 100 including terminal members each having terminal grooves that accommodate the coils 60 so that the coils 60 are electrically connected to the terminal grooves. The busbar unit 10 for a motor includes a holder 200 configured to support the terminal part 100.

For reference, the busbar unit 10 for a motor according to the embodiment of the present disclosure may be mounted in various types of motors in accordance with required conditions and design specifications, and the present disclosure is not restricted or limited by the types and structures of the motors.

As an example, a motor, to which the busbar unit 10 according to the exemplary embodiment of the present disclosure is applied, may be used as a drive motor for an environmentally-friendly vehicle, such as a hybrid vehicle and/or an electric vehicle, which obtains driving power from electrical energy.

For example, the drive motor is an inner-rotor-type synchronous motor and includes the stator 20 installed in a motor housing (not illustrated), and a rotor (not illustrated) rotatably installed in the stator 20 with a predetermined air gap from the stator 20. The busbar unit 10 according to the exemplary embodiment of the present disclosure may be connected to the stator 20.

The stator 20 may be accommodated in the housing (not illustrated), and the coil 60 may be wound around the stator 20 so as to induce an electrical interaction between the stator and the rotor.

For example, the stator 20 may include a plurality of split cores 30 provided to cooperatively define a ring shape, and a support ring (not illustrated) provided to surround outer circumferential surfaces of the plurality of split cores 30.

The split core 30 may be variously changed in number and structure in accordance with required conditions and design specifications, and the present disclosure is not restricted or limited by the number of split cores 30 and the structure of the split core 30.

More specifically, the split core 30 may be provided by stacking a plurality of electrical steel sheets in an axial direction of the rotor.

A bobbin 50 (made of plastic, for example) is provided around each of the split cores, and the coil 60 is wound around the bobbin 50.

According to another exemplary embodiment of the present disclosure, the stator may include a single core.

The rotor is provided to be rotated by the electrical interaction between the stator 20 and the rotor.

As an example, the rotor may include a rotor core (not illustrated) and magnets (not illustrated). The rotor core may be structured by stacking a plurality of circular plates each provided in the form of a thin steel sheet or structured in the form of a bin.

A hole (not illustrated), to which a shaft is coupled, may be provided at a center of the rotor. Protrusions (not illustrated), which guide the magnets, may protrude from an outer circumferential surface of the rotor core. The magnets may be attached to the outer circumferential surface of the rotor core so as to be spaced apart from one another at predetermined intervals in a circumferential direction of the rotor core.

In addition, the rotor may include a can member (not illustrated) disposed to surround the magnets and configured to prevent the separation of the magnets.

The busbar unit 10 includes the terminal part 100 and the holder 200, and the busbar unit 10 is disposed at the upper side of the stator 20.

The terminal part 100 is provided to electrically connect the coils 60 of the stator 20 to an external power source.

Figure 1:
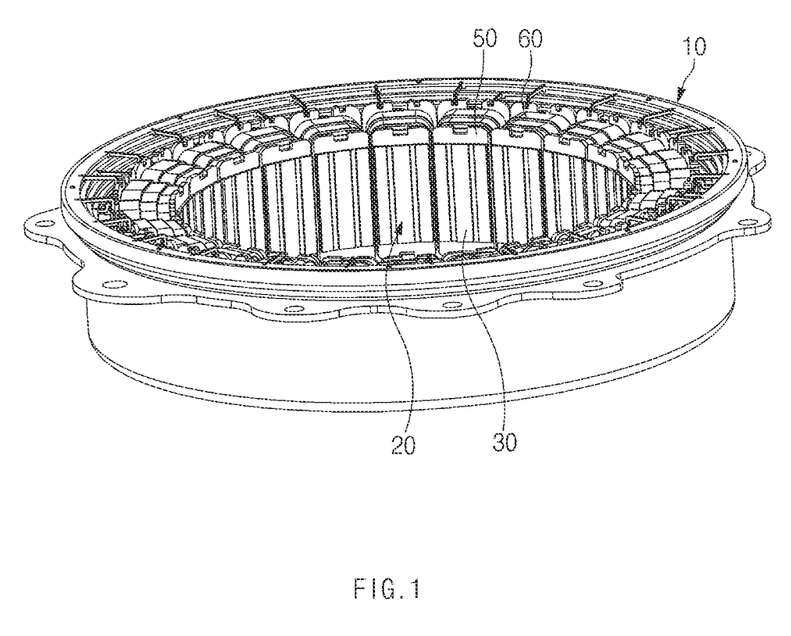
FIG. 1 is a view for explaining an example in which a busbar unit for a motor according to an embodiment of the present disclosure is mounted.
Figure 2:
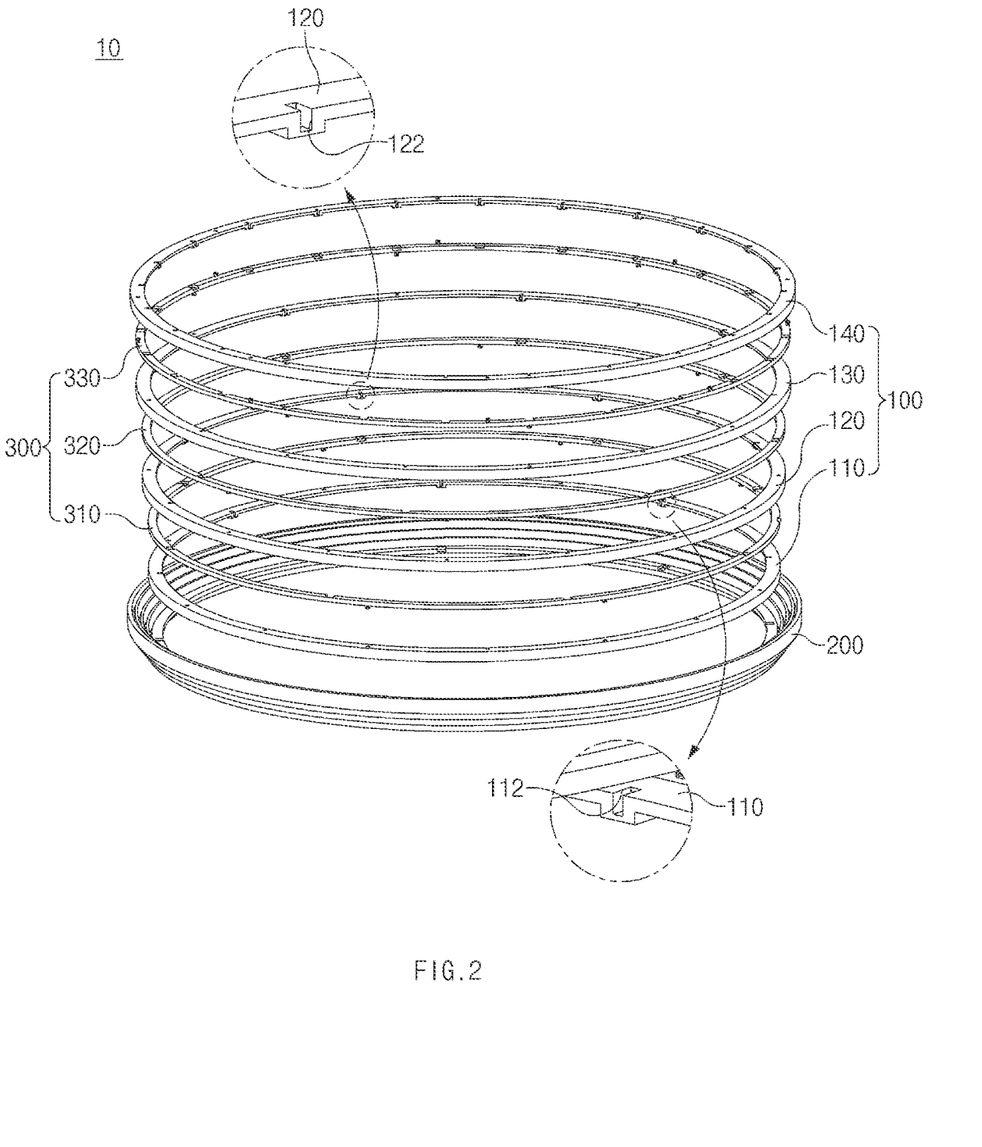
FIG. 2 is a view for explaining the busbar unit for a motor according to the embodiment of the present disclosure.
Figure 3:
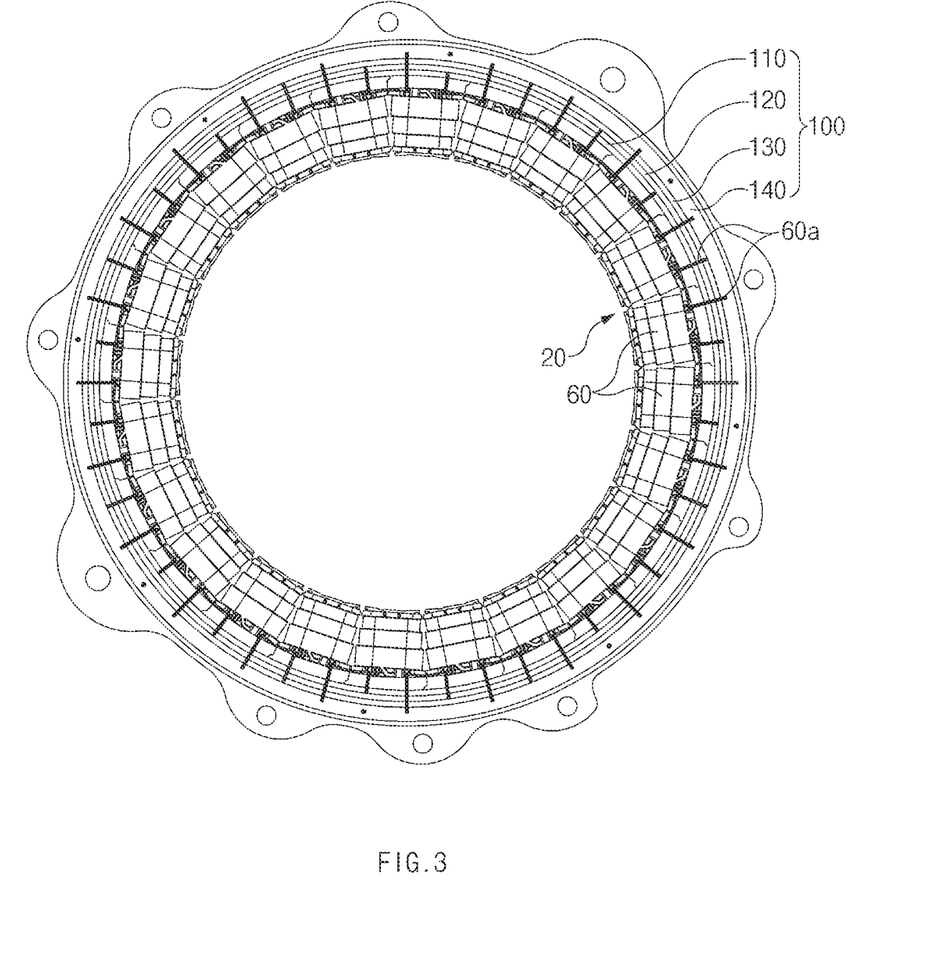
FIG. 3 is a view for explaining a terminal part of the busbar unit for a motor according to the embodiment of the present disclosure.
Figure 4:
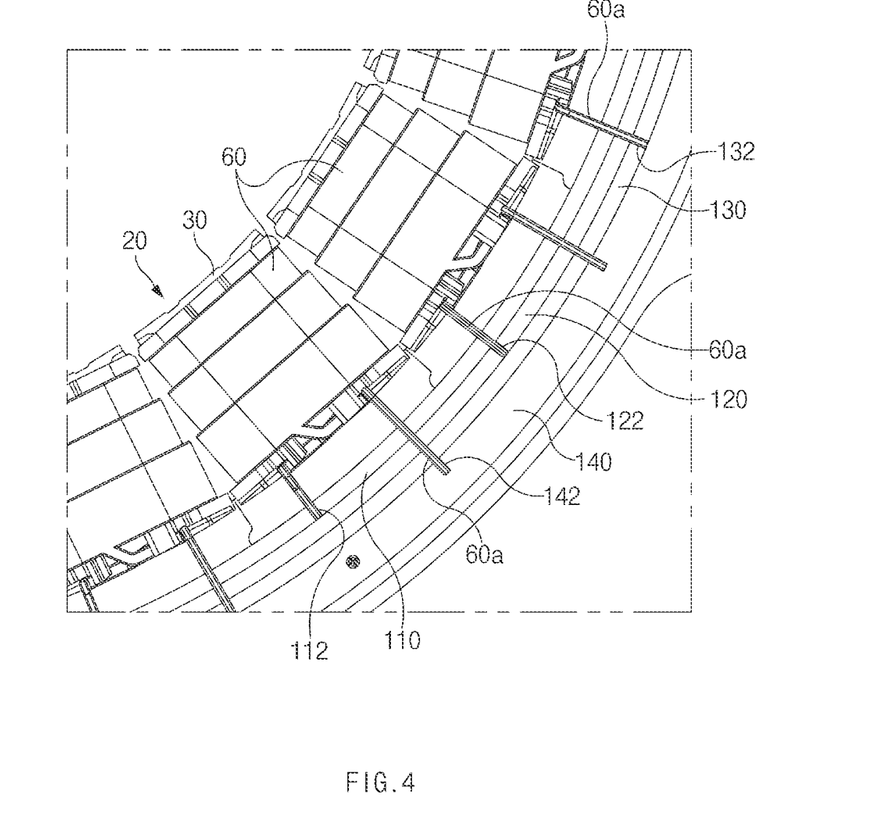
FIGS. 4 and 5 are views for explaining a structure in which terminal grooves and coils of the busbar unit for a motor according to the embodiment of the present disclosure are connected.
Figure 5:
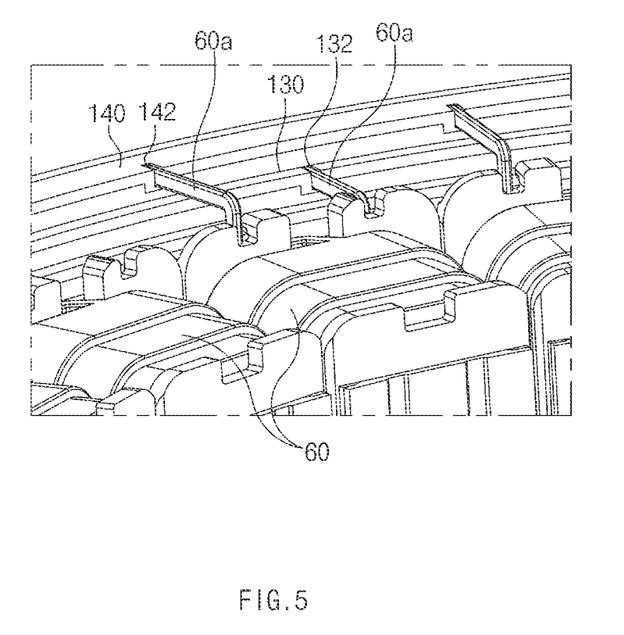

For example, referring to FIG. 2, the terminal part 100 may include a first terminal member 110, a second terminal member 120, a third terminal member 130, and a fourth terminal member 140.

In particular, the first to fourth terminal members 110, 120, 130, and 140 may each be at least one of phase terminals (a U-phase terminal, a V-phase terminal, and a W-phase terminal) connected to a U-phase power source, a V-phase power source, and a W-phase power source and a neutral terminal for electrically connecting the phase terminals.

The first to fourth terminal members 110, 120, 130, and 140 may be variously changed in structure and shape in accordance with required conditions and design specifications. For example, the first to fourth terminal members 110, 120, 130, and 140 each have a ring shape having a predetermined diameter and a double-layer structure (multilayered structure) having a bent portion.

According to another embodiment of the present disclosure, the first to fourth terminal members may each have an arc shape having a predetermined curvature or have a single-layer structure.

Terminal grooves (first to fourth terminal grooves 112, 122, 132, and 142) are provided in upper portions of the first to fourth terminal members 110, 120, 130, and 140. An end 60a of the coil 60 is accommodated (seated) in each of the terminal grooves 112, 122, 132, and 142 so as to be electrically connected to the terminal grooves.

More specifically, referring to FIGS. 2 to 5, the first terminal member 110 may have the first terminal grooves 112, the second terminal member 120 may have the second terminal grooves 122, the third terminal member 130 may have the third terminal grooves 132, and the fourth terminal member 140 may have the fourth terminal grooves 142.

In particular, the first to fourth terminal grooves 112, 122, 132, and 142 may be exposed from the upper portions (e.g., the upper surfaces) of the first to fourth terminal members 110, 120, 130, and 140, respectively. According to another embodiment of the present disclosure, the terminal grooves may be provided in an inner circumferential surface or other portions of each of the first to fourth terminal members.

The first to fourth terminal grooves 112, 122, 132, and 142 may each have various structures capable of accommodating the end 60a of the coil 60 so that the coil 60 may be electrically connected to the terminal grooves, and the present disclosure is not restricted or limited by the structures and shapes of the first to fourth terminal grooves 112, 122, 132, and 142.

In this case, the configuration in which the coil 60 is accommodated in each of the first to fourth terminal grooves 112, 122, 132, and 142 so as to be electrically connected to the terminal grooves may mean that the end 60a of the coil 60 is electrically connected to each of the first to fourth terminal members 110, 120, 130, and 140 while being accommodated in each of the first to fourth terminal grooves 112, 122, 132, and 142.

In particular, the first to fourth terminal grooves 112, 122, 132, and 142 may each have a width corresponding to a thickness (width) of the end 60a of the coil 60.

The first to fourth terminal grooves 112, 122, 132, and 142 may be provided in various ways in accordance with required conditions and design specifications.

For example, the first terminal groove 112 may be provided by partially bending a part of the first terminal member 110.

Since the first terminal groove 112 is provided to have a recessed (bent) structure made by partially pressing the upper surface of the first terminal member 110, as described above, it is possible to obtain an advantageous effect of simplifying a process of manufacturing the first terminal groove 112 and reducing the time required to manufacture the first terminal groove 112.

According to another embodiment of the present disclosure, the terminal grooves (first to fourth terminal grooves) may each be provided by partially removing (e.g., machining) the upper surface of each of the first to fourth terminal members.

In particular, the first terminal member 110 may include a first horizontal terminal body 110a and a first vertical terminal body 110b. The first horizontal terminal body 110a may have the first terminal grooves 112. The first vertical terminal body 110b may be connected to an end of the first horizontal terminal body 110a. The first horizontal terminal body 110a and the first vertical terminal body 110b may be provided to cooperatively define an approximately "L" shape.

In addition, the second terminal member 120 may include a second horizontal terminal body 120a and a second vertical terminal body 120b. The second horizontal terminal body 120a may have the second terminal grooves 122 and be stacked on an upper portion of the first horizontal terminal body 110a so that the first terminal grooves 112 are exposed. The second vertical terminal body 120b may be connected to an end of the second horizontal terminal body 120a so as to face an outer surface of the first horizontal terminal body 110a. The second horizontal terminal body 120a and the second vertical terminal body 120b may be provided to cooperatively define an approximately "L" shape.

In addition, the third terminal member 130 may include a third horizontal terminal body 130a and a third vertical terminal body 130b. The third horizontal terminal body 130a may have the third terminal grooves 132 and be stacked on an upper portion of the second horizontal terminal body 120a so that the second terminal grooves 122 are exposed. The third vertical terminal body 130b may be connected to an end of the third horizontal terminal body 130a so as to face an outer surface of the second horizontal terminal body 120a. The third horizontal terminal body 130a and the third vertical terminal body 130b may be provided to cooperatively define an approximately "L" shape.

In addition, the fourth terminal member 140 may include a fourth horizontal terminal body 140a and a fourth vertical terminal body 140b. The fourth horizontal terminal body 140a may have the fourth terminal grooves 142 and be stacked on an upper portion of the third horizontal terminal body 130a so that the third terminal grooves 132 are exposed. The fourth vertical terminal body 140b may be connected to an end of the fourth horizontal terminal body 140a so as to face an outer surface of the third horizontal terminal body 130a. The fourth horizontal terminal body 140a and the fourth vertical terminal body 140b may be provided to cooperatively define an approximately "L" shape.

In the embodiment of the present disclosure illustrated and described above, the example has been described in which all the first to fourth terminal members 110, 120, 130, and 140 each have the horizontal terminal body and the vertical terminal body. However, according to another embodiment of the present disclosure, one of the first to fourth terminal members may have only the horizontal terminal body without the vertical terminal body.

As described above, in the embodiment of the present disclosure, the first to fourth terminal members 110, 120, 130, and 140 may be partially stacked in a stepwise manner (stacked in a vertical direction based on FIG. 7), such that all the first to fourth terminal grooves 112, 122, 132, and 142 may be exposed from the upper surface of the busbar unit 10. Therefore, the coils 60 may be electrically connected to the first to fourth terminal members 110, 120, 130, and 140 when the ends 60a of the coils 60 are seated in the first to fourth terminal grooves 112, 122, 132, and 142, respectively, in the state in which the first to fourth terminal members 110, 120, 130, and 140 are stacked.

Among other things, according to the embodiment of the present disclosure, the coils 60 may be electrically connected to the first to fourth terminal members 110, 120, 130, and 140 by means of the first to fourth terminal grooves 112, 122, 132, and 142 without applying a compressing force and heat to the coils 60. Therefore, it is possible to obtain an advantageous effect of minimizing the damage to the coil 60 and the deterioration in durability of the coil 60 and improving stability and reliability. Therefore, since the strength and durability of the coil 60 may be sufficiently ensured, it is possible to obtain an advantageous effect of minimizing the damage to and the deformation of the coil 60 caused by the vibration of the motor or the external impact applied thereto. Further, it is possible to obtain an advantageous effect of preventing the coils 60 from separating from the first to fourth terminal members 110, 120, 130, and 140.

In addition, according to the embodiment of the present disclosure, the coils 60 are electrically connected to the first to fourth terminal members 110, 120, 130, and 140 by being inserted into the first to fourth terminal grooves 112, 122, 132, and 142, and thus a fusing process of electrically connecting the coils 60 to the first to fourth terminal members 110, 120, 130, and 140 may be excluded. Therefore, it is possible to obtain an advantageous effect of further simplifying the manufacturing process, improving the work efficiency, and reducing the manufacturing time.

Moreover, according to the embodiment of the present disclosure, since the first to fourth terminal members 110, 120, 130, and 140 are partially stacked in a stepwise manner, it is possible to obtain an advantageous effect of minimizing an increase in diameter of the busbar unit 10 that may be caused when the first to fourth terminal members 110, 120, 130, and 140 are stacked in the vertical direction.

The holder 200 is provided to support the arrangement state of the terminal part 100 and electrically insulate the first to fourth terminal members 110, 120, 130, and 140.

The holder 200 may be variously changed in material and structure in accordance with required conditions and design specifications, and the present disclosure is not restricted or limited by the material and structure of the holder 200.

For example, the holder 200 may have a hollow ring shape and be provided as a molded product (made of an insulating material, for example) provided by injection molding.

In particular, the holder 200 may include a first accommodation portion 210 configured to accommodate the first vertical terminal body 110b, a second accommodation portion 220 configured to accommodate the second vertical terminal body 120b, a third accommodation portion 230 configured to accommodate the third vertical terminal body 130b, and a fourth accommodation portion 240 configured to accommodate the fourth vertical terminal body 140b.

The first to fourth accommodation portions 210, 220, 230, and 240 are spaced apart from one another in a radial direction of the holder 200 and disposed to have a stepped structure (a difference in height).

The first to fourth terminal members 110, 120, 130, and 140 may be assembled with the holder 200 by inserting the first to fourth vertical terminal bodies 110b, 120b, 130b, and 140b sequentially into the first to fourth accommodation portions 210, 220, 230, and 240 (e.g., insertion in order of the first vertical terminal body→the second vertical terminal body→the third vertical terminal body→the fourth vertical terminal body).

Meanwhile, the first to fourth terminal members 110, 120, 130, and 140 may include power terminal portions (not illustrated) protruding from an outer circumferential surface of the holder 200.

The power terminal portion may extend from the outer surface of each of the first to fourth terminal members 110, 120, 130, and 140 and protrude from the outer circumferential surface of the holder 200. The power terminal portion may be electrically connected to each of external power cables corresponding to the respective phases (the U-phase, the V-phase, and the W-phase).

According to the exemplary embodiment of the present disclosure, the coils 60 seated in the first to fourth terminal grooves 112, 122, 132, and 142 may be fixed by welding.

Since the coils 60 seated in the first to fourth terminal grooves 112, 122, 132, and 142 are fixed by welding, as described above, it is possible to obtain an advantageous effect of stably maintaining the arrangement state of the coils 60 seated in the first to fourth terminal grooves 112, 122, 132, and 142 and more effectively inhibiting the separation of the coils 60.

For example, the coils 60 seated in the first to fourth terminal grooves 112, 122, 132, and 142 may be fixed by laser welding. Since the coils 60 seated in the first to fourth terminal grooves 112, 122, 132, and 142 are fixed by laser welding, as described above, it is possible to obtain an advantageous effect of accurately and precisely welding the coils and minimizing damage to and deformation of the terminal members and the peripheral components (e.g., the housing) during the process of welding the coils 60.

In particular, the coils 60 seated in the first to fourth terminal grooves 112, 122, 132, and 142 are fixed by welding using green laser beams (visible laser beams).

This is based on the fact that the coil 60 made of copper has high reflectance (low light absorptivity) and thus is difficult to weld with an infrared laser. The light absorptivity of the copper coil 60 may be ensured by irradiating the copper coil 60 with the green laser beam with a visible wavelength. Therefore, it is possible to obtain an advantageous effect of improving efficiency in welding the coil 60 and reducing the welding time.

Figure 7:
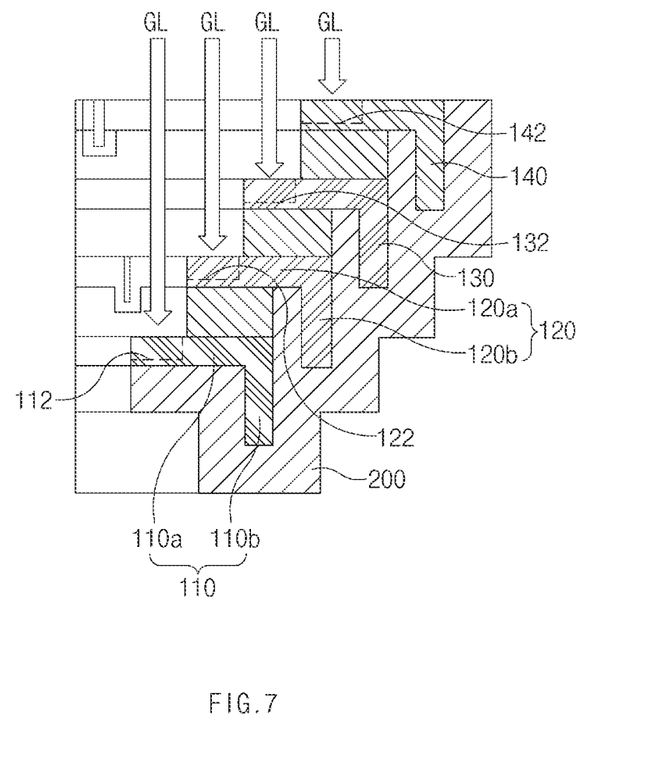
FIG. 7 is a view for explaining laser beams applied to the coils of the busbar unit for a motor according to the embodiment of the present disclosure.

In particular, a green laser beam GL may be applied to the upper portion of the coil 60 in the vertical direction from above the busbar unit 10.

The green laser beam (visible laser beam) may be implemented in various ways in accordance with required conditions and design specifications. For example, the green laser beam may be made by adding an optical system (e.g., second harmonic generation (SHG) and third harmonic generation (THG)) to a diode laser that emits a laser beam with a basic wavelength of 1,064 nm. For example, the green laser beam may have a wavelength of 532 nm.

Figure 6:
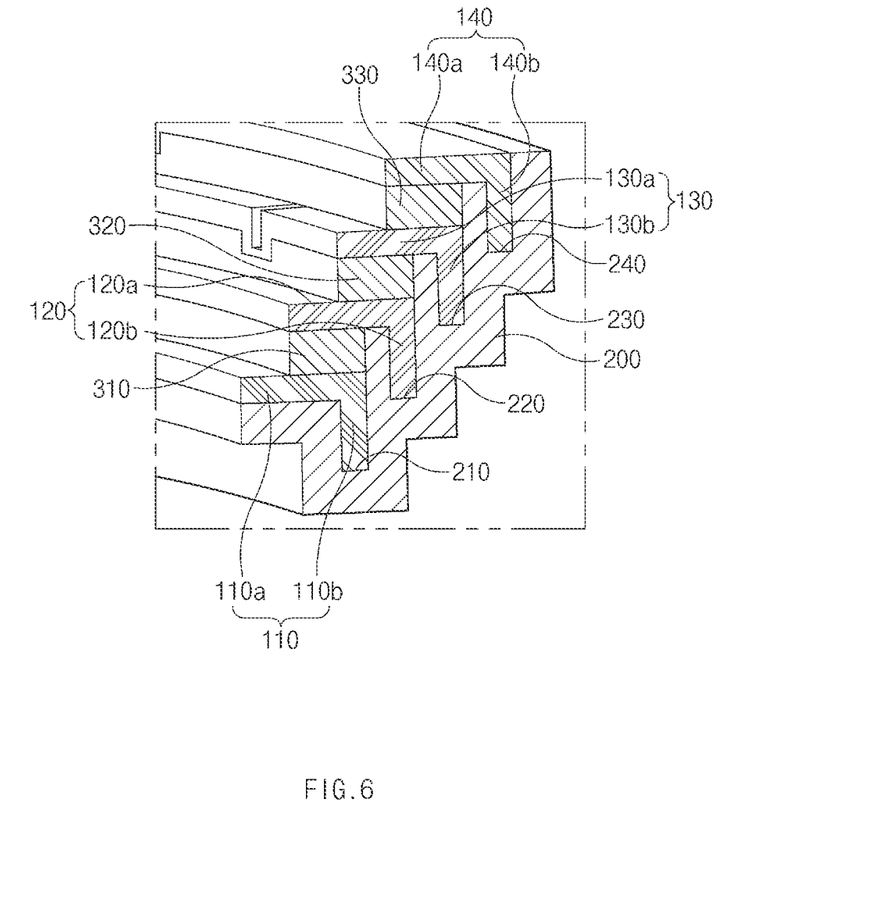
FIG. 6 is a view for explaining a terminal member of the busbar unit for a motor according to the embodiment of the present disclosure.

Referring to FIGS. 2, 6, and 7, according to the exemplary embodiment of the present disclosure, the busbar unit 10 may include spacers 300 each interposed between the adjacent terminal members (among the first to fourth terminal members).

The spacer 300 may be provided to electrically insulate the adjacent terminal members (among the first to fourth terminal members).

The spacer 300 may have various materials and structures capable of electrically insulating the adjacent terminal members (among the first to fourth terminal members 110, 120, 130, and 140), and the present disclosure is not restricted or limited by the material and structure of the spacer.

For example, the spacer 300 may have a ring shape and be interposed between the adjacent horizontal terminal bodies. More specifically, a first spacer 310 may be interposed between the first horizontal terminal body 110a and the second horizontal terminal body 120a, a second spacer 320 may be interposed between the second horizontal terminal body 120a and the third horizontal terminal body 130a, and a third spacer 330 may be interposed between the third horizontal terminal body 130a and the fourth horizontal terminal body 140a.

In particular, the first spacer 310 may have an inner circumferential surface corresponding to an inner diameter of the second horizontal terminal body 120a, the second spacer 320 may have an inner circumferential surface corresponding to an inner diameter of the third horizontal terminal body 130a, and the third spacer 330 may have an inner circumferential surface corresponding to an inner diameter of the fourth horizontal terminal body 140a.

In this case, for example, the configuration in which the first spacer 310 has the inner circumferential surface corresponding to the inner diameter of the second horizontal terminal body 120a means that the inner diameter of the first spacer 310 is equal to the inner diameter of the second horizontal terminal body 120a.

Likewise, the second spacer 320 may have the inner circumferential surface corresponding to the third horizontal terminal body 130a, and the third spacer 330 may have the inner circumferential surface corresponding to the fourth horizontal terminal body 140a.

Since the first spacer 310 has the inner circumferential surface corresponding to the inner diameter of the second horizontal terminal body 120a, as described above, it is possible to obtain an advantageous effect of minimizing interference with the first spacer 310 and minimizing damage to the first spacer 310 during the process of welding the coil 60 accommodated in the first terminal groove 112 provided in the first horizontal terminal body 110a.

Figure 8:
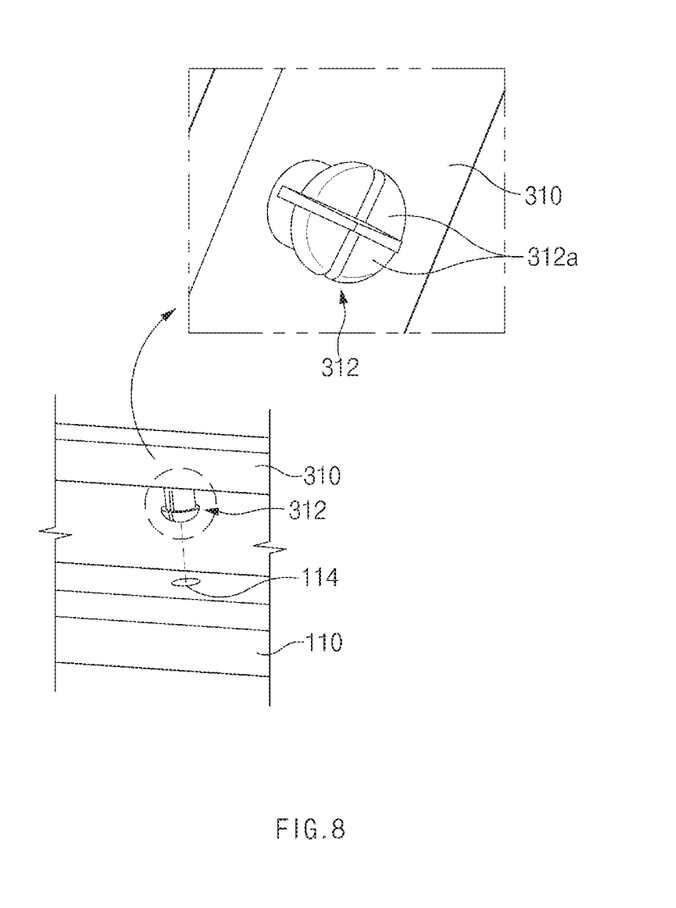
FIGS. 8 and 9 are views for explaining a fastening portion and a fastening hole of the busbar unit for a motor according to the embodiment of the present disclosure.
Figure 9:
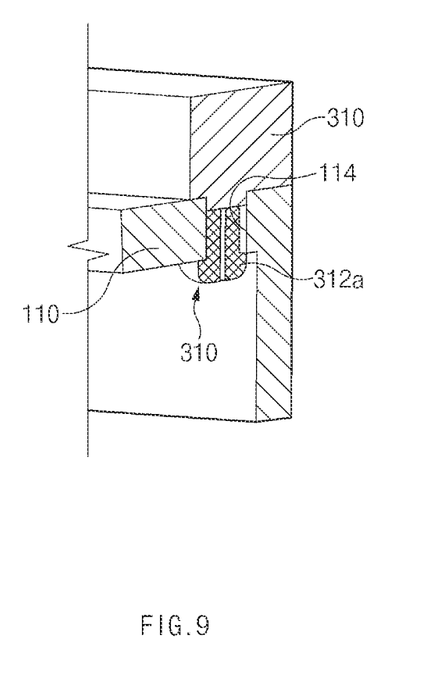

Referring to FIGS. 8 and 9, according to the exemplary embodiment of the present disclosure, the busbar unit 10 may include a fastening hole 114 provided in any one of the first terminal member 110 and the second terminal member 120, and a fastening portion 312 provided on the spacer 300 so as to be fastened to the fastening hole 114.

The fastening portion 312 and the fastening hole 114 are provided to stably maintain the arrangement state and inhibit the movements and rotations of the first to third spacers 310, 320, and 330 when the first to third spacers 310, 320, and 330 are interposed between the first to fourth terminal members 110, 120, 130, and 140.

Hereinafter, an example will be described in which the fastening hole 114 is provided in an upper portion of the first terminal member 110 and the fastening portion 312 is provided on a lower portion of the first spacer 310.

Likewise, the fastening holes (not illustrated) may be provided in upper portions of the second and third terminal members 120 and 130, respectively, and the fastening portions (not illustrated) may be provided on lower portions of the second and third spacers 320 and 330, respectively.

The fastening portion 312 may have various structures capable of being fastened to the fastening hole 114, and the present disclosure is not restricted or limited by the structure of the fastening portion 312.

For example, the fastening portion 312 may include snap-fit coupling portions 312a configured to be fastened to the fastening hole 114 in a snap-fit manner.

The snap-fit coupling portions 312a may be elastically coupled to the fastening hole 114 in a snap-fit manner using elasticity of the material (e.g., plastic material) thereof.

The snap-fit coupling portions 312a may be variously changed in structure and number in accordance with required conditions and design specifications. For example, the fastening portion 312 may include four snap-fit coupling portions 312a made by dividing the fastening portion 312 based on an approximately cross-shaped space.

According to another embodiment of the present disclosure, the fastening portion may include two or fewer snap-fit coupling portions or five or more snap-fit coupling portions.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A busbar assembly electrically connected to a motor comprising a stator around which coils are wound, the busbar unit comprising:
    a terminal part comprising terminal members each including terminal grooves configured to accommodate the coils such that the coils are electrically connected to the terminal grooves; and
    a holder configured to support the terminal part,
    wherein the terminal members comprise
        a first terminal member comprising
            a first horizontal terminal body including first terminal grooves, among the terminal grooves, configured to accommodate the coils, and
            a first vertical terminal body connected to an end of the first horizontal terminal body;
        a second terminal member comprising
            a second horizontal terminal body including second terminal grooves, among the terminal grooves, configured to accommodate the coils, the second horizontal terminal body being stacked on an upper portion of the first horizontal terminal body such that the first terminal grooves are exposed, and the second horizontal terminal body having a form of a continuous ring, and a second vertical terminal body connected to an end of the second horizontal terminal body; and a spacer interposed between the first horizontal terminal body and the second horizontal terminal body, and the spacer having an inner circumferential surface corresponding to an inner diameter of the second horizontal terminal body.

2. The busbar assembly of claim 1, wherein the terminal grooves are exposed from upper portions of the terminal members.

3. The busbar assembly of claim 2, wherein the coils are seated in the terminal grooves and fixed in the terminal grooves by welds.

4. The busbar assembly of claim 3, wherein the welds comprise laser welds.

5. The busbar assembly of claim 3, wherein the welds comprise welds formed by a green laser beam.

6. The busbar assembly of claim 1, wherein the holder comprises:

a first accommodation portion configured to accommodate the first vertical terminal body; and a second accommodation portion configured to accommodate the second vertical terminal body.

7. The busbar assembly of claim 1, wherein a fastening hole is disposed in one of the first terminal member or the second terminal member, and a fastening portion configured to be fastened to the fastening hole is disposed on the spacer.

8. The busbar assembly of claim 7, wherein the fastening portion comprises a snap-fit coupling portion configured to be fastened to the fastening hole in a snap-fit manner.

9. A busbar assembly electrically connected to a motor comprising a stator around which coils are wound, the busbar unit comprising:

a terminal part comprising terminal members each including terminal grooves configured to accommodate the coils such that the coils are electrically connected to the terminal grooves; and a holder configured to support the terminal part, wherein the terminal members comprise a first terminal member comprising a first horizontal terminal body including first terminal grooves, among the terminal grooves, configured to accommodate the coils, and a first vertical terminal body connected to an end of the first horizontal terminal body;

a second terminal member comprising a second horizontal terminal body including second terminal grooves, among the terminal grooves, configured to accommodate the coils, and the second horizontal terminal body being stacked on an upper portion of the first horizontal terminal body such that the first terminal grooves are exposed, and a second vertical terminal body connected to an end of the second horizontal terminal body; and a spacer interposed between the first terminal member and the second terminal member, and wherein a fastening hole is disposed in either one of the first terminal member and the second terminal member, and a fastening portion configured to be fastened to the fastening hole is disposed on the spacer.

10. The busbar assembly of claim 9, wherein the fastening portion comprises a snap-fit coupling portion configured to be fastened to the fastening hole in a snap-fit manner.

* * * * *